H. ORRECHT.
Meat Chopper.
No. 66,989.
Patented July 23, 1867.
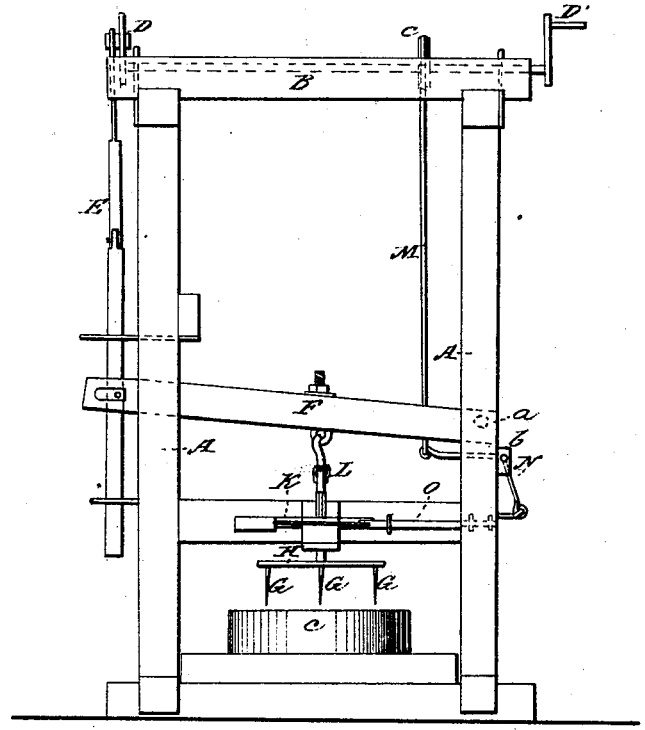
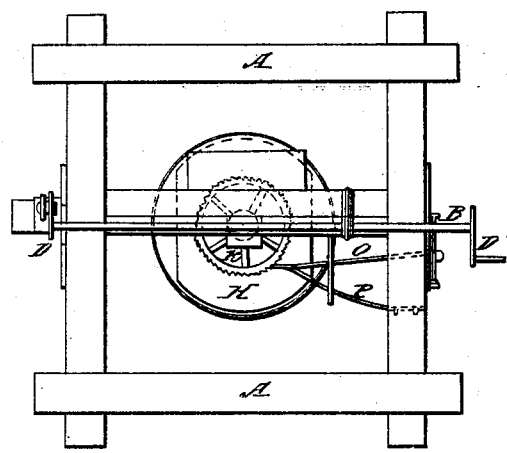
Witnesses:
Inventor:
Henry Obrecht

United States Patent Office.

HENRY OBRECHT, OF MAHANOY CITY, PENNSYLVANIA.

Letters Patent No. 66,989, dated July 23, 1867.

IMPROVED MEAT-CHOPPER.

*The Schedule referred to in these Letters Patent and making part of the same.*

TO WHOM IT MAY CONCERN:

Be it known that I, HENRY OBRECHT, of Mahanoy City, in the county of Schuylkill, and State of Pennsylvania, have invented a new and useful Machine for Chopping Meat; and I do hereby declare that the following is a full, clear, and exact description thereof, which will enable others skilled in the art to make and use the same, reference being had to the accompanying drawing, forming part of this specification, in which—

Figure 1 is a front elevation, and

Figure 2 a plan or top view of my invention complete, the object of which is fully explained by the title, viz, the expeditious and inexpensive chopping of meat and other substances of a similar nature capable of manipulation by knives having a vertical and a rotary movement combined.

My invention will be more readily understood by referring to the different parts, bearing letters of reference corresponding to the same.

A is a wooden frame provided with horizontal pieces, to which are attached bearings and supports. B is a horizontal shaft having attached to it an eccentric, C, and two cranks, D D', at either end. E is a rod attached to the crank D above, and to the movable lever F below. G G G represent knives attached to the plate H and shaft I. L is a swivel. M is an eccentric rod attached to the rod N. K is a ratchet-wheel attached to the shaft I. O is a rod attached to the eccentric rod N, which has a horizontal motion, and which impinges upon the wheel K, and is kept in place by means of a spring, P. $a$ indicates the pivot of the lever F, and $b$ the pivot of the rod N. $c'$ is the receptacle for the meat.

The operation of my invention is as follows: The substance to be chopped is placed in the receptacle $b$; power is then applied to the crank D'; the shaft B revolves, causing the crank D and eccentric C to do likewise; the rod E communicates to the lever F, shaft I, plate H, and knives G a vertical reciprocating motion; the eccentric rod M transmits the motion to the rod N, which, being pivoted at $b$, converts the vertical motion of M into a lateral motion, which it transmits to the rod O, which in turn rotates the ratchet-wheel K, and thus the knives acquire the desired reciprocating and rotary motion.

Claim.

What I claim as new, and desire to secure by Letters Patent, is—

The lever F, rod O, wheel K, plate H, knives G, and swivel L, combined and arranged substantially as and for the purpose specified and set forth.

In witness whereof I have hereunto set my hand and signature.

HENRY OBRECHT.

Witnesses:
 JOHN C. KNAPP,
 HENRY SCHEURMANN.